US010249900B2

(12) United States Patent
Desie et al.

(10) Patent No.: US 10,249,900 B2
(45) Date of Patent: Apr. 2, 2019

(54) METHOD FOR PREPARING A COMPOSITE MEMBRANE

(71) Applicant: AGFA GEVAERT, Mortsel (BE)

(72) Inventors: Guido Desie, Mortsel (BE); Willem Mues, Mortsel (BE); Patrick Wouters, Mortsel (BE); Roger Hendriks, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 381 days.

(21) Appl. No.: 14/908,636

(22) PCT Filed: Aug. 25, 2014

(86) PCT No.: PCT/EP2014/067994
§ 371 (c)(1),
(2) Date: Jan. 29, 2016

(87) PCT Pub. No.: WO2015/028426
PCT Pub. Date: Mar. 5, 2015

(65) Prior Publication Data
US 2016/0172701 A1  Jun. 16, 2016

(30) Foreign Application Priority Data
Aug. 26, 2013  (EP) ..................................... 13181664

(51) Int. Cl.
*H01M 8/1053* (2016.01)
*H01M 8/1086* (2016.01)
(Continued)

(52) U.S. Cl.
CPC ...... *H01M 8/1053* (2013.01); *B01D 67/0088* (2013.01); *B01D 69/12* (2013.01);
(Continued)

(58) Field of Classification Search
USPC ........................................ 156/247, 249, 289
See application file for complete search history.

(56) References Cited

U.S. PATENT DOCUMENTS

| 5,547,551 | A | 8/1996 | Bahar et al. |
| 5,599,614 | A | 2/1997 | Bahar et al. |

(Continued)

FOREIGN PATENT DOCUMENTS

| DE | 10 2006 048 403 A1 | 4/2007 |
| EP | 0 718 903 A1 | 6/1996 |

(Continued)

OTHER PUBLICATIONS

Official Communication issued in International Patent Application No. PCT/EP2014/067994, dated Oct. 2, 2014.
(Continued)

*Primary Examiner* — Sing P Chan
(74) *Attorney, Agent, or Firm* — Keating and Bennett, LLP

(57) ABSTRACT

A method for making a composite membrane includes the steps of coating a first layer of ionomer on an intermediate support, laminating a dry porous support into the wet first layer of ionomer, impregnating the porous support with ionomer from the coated ionomer layer, optionally drying the impregnated porous support and the first layer of ionomer, coating a second layer of ionomer on the impregnated porous support, drying the second layer of ionomer until most of the solvent is evaporated, and delaminating the composite membrane from the intermediate support. The composite membrane thus obtained includes a porous support impregnated with the ionomer and on each side of the impregnated support a dense ionomer layer.

12 Claims, 6 Drawing Sheets

(51) Int. Cl.
*H01M 8/1081* (2016.01)
*H01M 8/1067* (2016.01)
*H01M 8/0293* (2016.01)
*B01D 67/00* (2006.01)
*B01D 69/12* (2006.01)
*H01M 8/1039* (2016.01)
*H01M 8/106* (2016.01)

(52) U.S. Cl.
CPC ......... *H01M 8/0293* (2013.01); *H01M 8/106* (2013.01); *H01M 8/109* (2013.01); *H01M 8/1039* (2013.01); *H01M 8/1067* (2013.01); *H01M 8/1081* (2013.01); *H01M 8/1086* (2013.01); *B01D 2323/26* (2013.01); *B01D 2323/286* (2013.01); *B01D 2323/42* (2013.01); *B01D 2323/46* (2013.01); *H01M 2300/0094* (2013.01); *Y02P 70/56* (2015.11)

(56) References Cited

U.S. PATENT DOCUMENTS

| | | |
|---|---|---|
| 5,635,041 A | 6/1997 | Bahar et al. |
| 6,130,175 A | 10/2000 | Rusch et al. |
| 6,689,501 B2 | 2/2004 | Stone et al. |
| 8,148,026 B2 * | 4/2012 | Oh ............... H01M 4/8636 429/480 |
| 2006/0234097 A1 | 10/2006 | Boehm et al. |
| 2007/0087245 A1 | 4/2007 | Fuller et al. |
| 2007/0128425 A1 * | 6/2007 | Hadj Romdhane ............ B01D 67/0009 428/304.4 |
| 2008/0083499 A1 | 4/2008 | Nodono |
| 2008/0206461 A1 * | 8/2008 | Patel ............ C09J 7/40 427/208.4 |
| 2008/0216942 A1 | 9/2008 | Hiraoka et al. |
| 2009/0324929 A1 | 12/2009 | Yamakawa et al. |
| 2013/0183547 A1 * | 7/2013 | Kourtakis ............ H01M 4/62 429/50 |

FOREIGN PATENT DOCUMENTS

| | | |
|---|---|---|
| EP | 1 702 668 A1 | 9/2006 |
| WO | 2012/174463 A1 | 12/2012 |

OTHER PUBLICATIONS

Penner et al., "Ion Transporting Composite Membranes", Journal of the Electrochemical Society, 1985, vol. 132, No. 2, pp. 514 & 515.

* cited by examiner

Figure 1: a schematic representation of a first embodiment of a method according to the present invention.
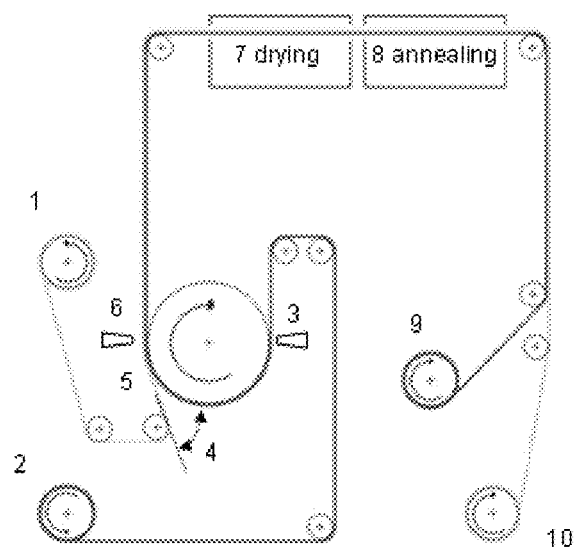

Figure 2: a schematic representation of a second embodiment of a method according to the present invention.
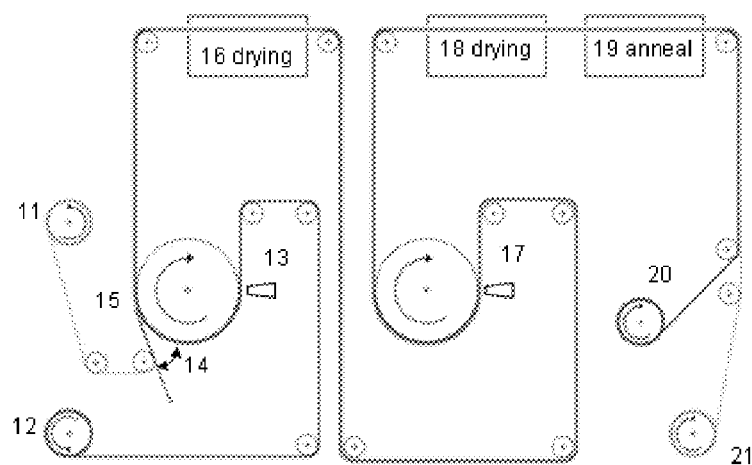

Figure 3: SEM image of the composite membrane obtained by the comparative method of EXAMPLE 1.
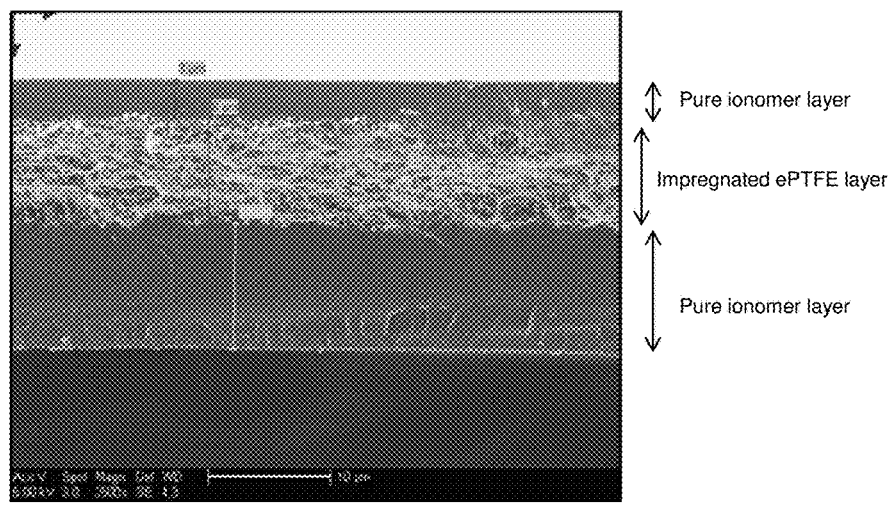
Figure 4: SEM images of the composite membrane obtained by the inventive method of EXAMPLE 2.
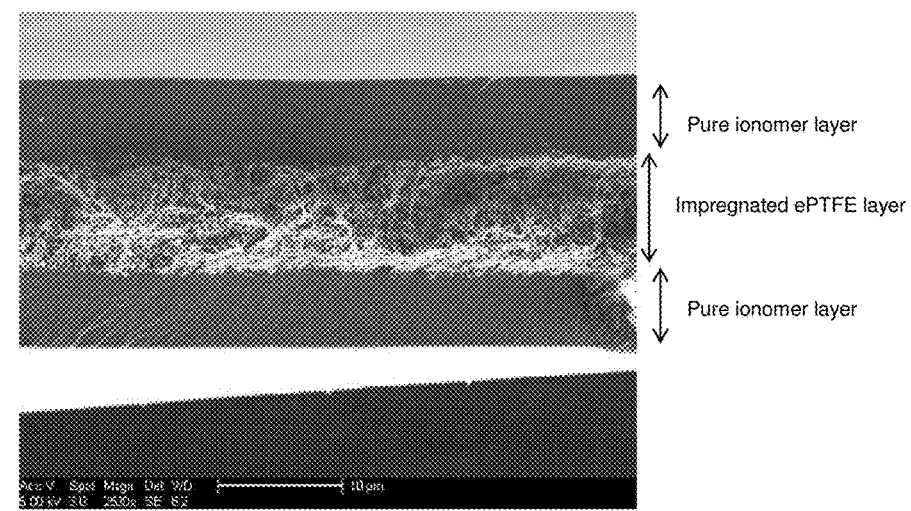

Figure 5: SEM image of the composite membrane obtained by the Inventive method of EXAMPLE 3.
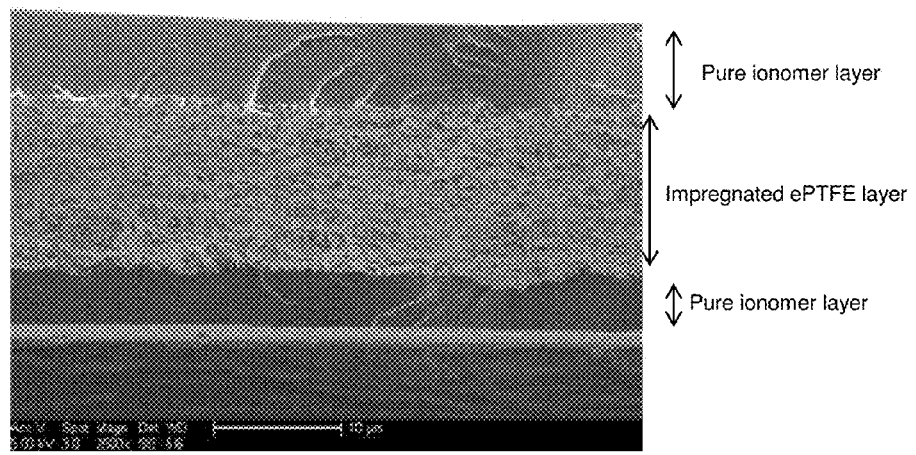
Figure 6: SEM image of the composite membrane obtained by the Inventive method of EXAMPLE 4.
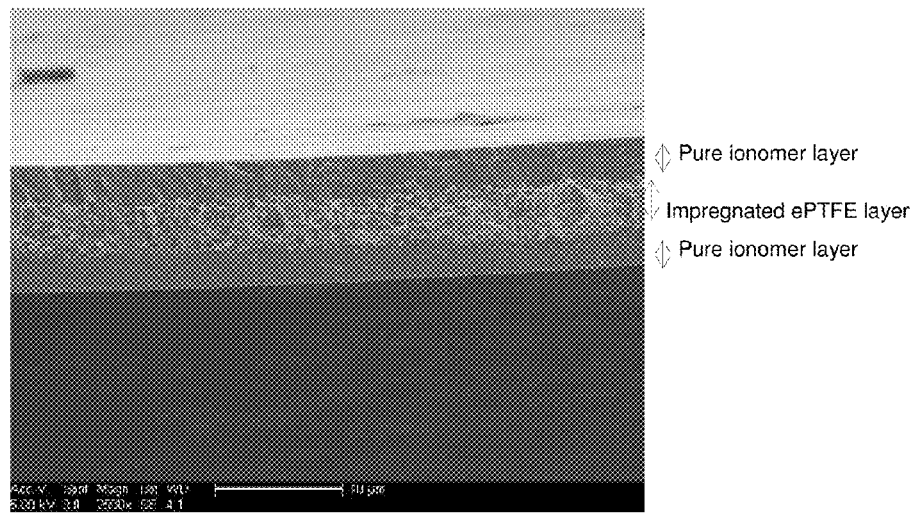

Figure 7: SEM image of the composite membrane obtained by the Inventive method of EXAMPLE 5.
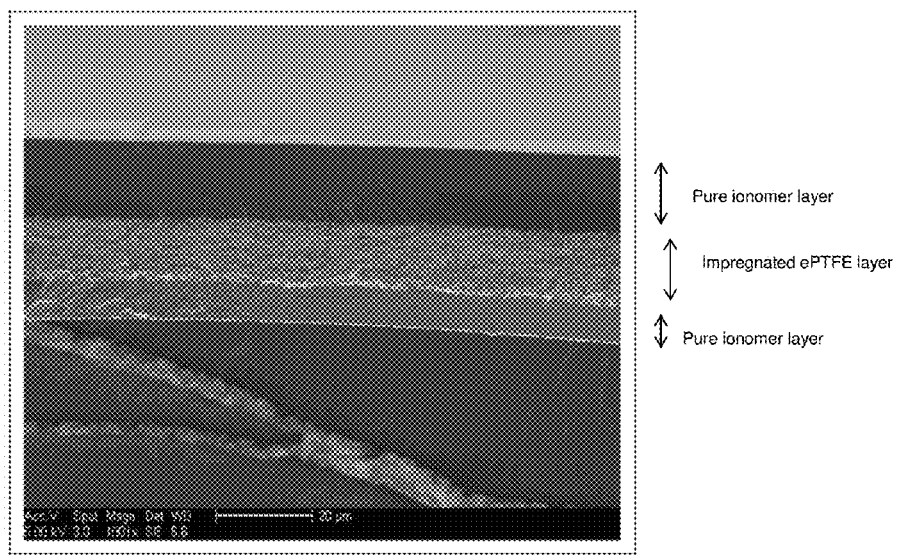

Figure 8: SEM image of the composite membrane obtained by a multi-pass coating to obtain a thick composite membrane. FIG 8a illustrates a 2-pass coating, FIG 8b a 4-pass coating.

METHOD FOR PREPARING A COMPOSITE MEMBRANE

CROSS-REFERENCE TO RELATED APPLICATIONS

This application is a 371 National Stage Application of PCT/EP2014/067994, filed Aug. 25, 2014. This application claims the benefit of European Application No. 13181664.7, filed Aug. 26, 2013, which is incorporated by reference herein in its entirety.

BACKGROUND OF THE INVENTION

1. Field of the Invention

The present invention relates to a method for preparing a composite ion exchange membrane, and in particular, for making a composite ion exchange membranes for use in solid polymer electrolyte fuel cells.

2. Description of the Related Art

Ion exchange membranes are principal components of electrochemical cells such as solid polymer electrolyte fuel cells, chlor-alkali electrolysis cells, and batteries. Ion exchange membranes are also employed in diffusion dialysis, electrodialysis, pervaporation, and vapor permeation applications.

Anion, cation, and amphoteric ion exchange membranes are known.

Ion exchange membranes may comprise dense polymer films. For example, Nafion® membranes are commercially available dense film perfluorosulfonic acid (PFSA) ion exchange membranes suitable for use in solid polymer electrolyte fuel cells and chlor-alkali electrolysis cells. The polymeric compositions comprising substituted $\alpha,\beta,\beta$-trifluorostyrene monomers disclosed in U.S. Pat. No. 5,422,411 may also be used to prepare such dense films for ion exchange membranes.

Currently available dense film ion exchange membranes suffer certain practical limitations for use in electrochemical cells such as fuel cells, such as for example cost and thickness.

For ease of handling, for example in the preparation of membrane electrode assemblies (MEA) for use in fuel cells, the mechanical strength of the membrane in the dry state and hydrated state is important. In electrochemical applications, such as electrolytic cells and fuel cells, the dimensional stability of the membrane during operation is also important. Further, to improve their performance, it is generally desirable to reduce the membrane thickness and to decrease the equivalent weight of the membrane electrolyte, both of which tend to decrease both the mechanical strength and the dimensional stability in the hydrated state.

One approach for improving mechanical strength and dimensional stability relative to dense film ion exchange membranes is through the use of a porous reinforcing support material. For example, an unsupported membrane can be preformed and then laminated to the reinforcing support, or a dense film may be formed directly on a surface of the reinforcing support. The reinforcing support is typically selected so that it imparts some mechanical strength and dimensional stability relative to the dense film ion exchange membrane. Composite membranes (discussed below) have also been laminated with reinforcing supports to form reinforced membranes.

Laminating or otherwise combining a reinforcing support with a dense film membrane or a composite membrane, while increasing mechanical strength and dimensional stability, is however not totally beneficial. One reason is that the reinforcing support tends to defeat the purpose of a thin membrane by increasing the overall thickness. Another reason, which also leads to reduced ionic conductivity, is due to the "shadowing" effect of the reinforcing support. The shortest path for an ion through a membrane is a perpendicular path from one surface to the other surface. Reinforcing supports are typically made from materials that are not ion-conductive. Those parts of the reinforced ion exchange membrane where an ion cannot travel perpendicularly across the membrane, but must take a circuitous route around the reinforcing support, are "shadowed" areas. The presence of shadowed areas in the reinforced membrane reduces the effective area of the membrane that actively conducts ions, thereby decreasing the effective ionic conductivity of the membrane.

Another approach for improving mechanical strength and dimensional stability in ion exchange membranes is to impregnate an ion-conductive material into a porous substrate material to form a composite membrane. Such composite ion exchange membranes prepared by impregnating a commercially-available microporous polytetra-fluoroethylene (ePTFE) film (Gore-Tex®) with Nafion®, have been described in the Journal of the Electrochemical Society, Vol. 132, pp. 514-515 (1985). The major goal in the study was to develop a composite membrane with the desirable features of Nafion®, but which could be produced at a low cost. Similarly, U.S. Pat. No. 5,547,551, U.S. Pat. No. 5,599,614 and U.S. Pat. No. 5,635,041 describe composite membranes comprising microporous expanded PTFE substrates impregnated with Nafion®. Gore-Select® membranes (available from W.L. Gore & Associates) are composite membranes comprising a microporous expanded PTFE membrane having an ion exchange material impregnated therein.

EP-A 718903 describes a method for making reinforced Proton Exchange Membranes (PEM) by placing the ePTFE on a hoop and impregnating the ePTFE on both sides by placing the ionomer on top of the ePTFE. Both dipping, brushing and spraying of the ionomer are described.

In U.S. Pat. No. 5,547,551 the same principle for the fabrication of the impregnated membrane is described.

U.S. Pat. No. 6,689,501 discloses an asymmetric composite membrane for use in a fuel cell membrane electrode assembly, the composite membrane comprising (a) a porous polymeric substrate; (b) an impregnant comprising a cation exchange material, the impregnant partially filling the substrate such that the substrate comprises a first region having pores substantially filled with the impregnant, and a second substantially porous region; and (c) a dense surface layer comprising the cation exchange material, the dense layer contiguous with the first region of the substrate, wherein the substrate has greater than 10% residual porosity, and the composite membrane is substantially gas impermeable and has a substantially porous major surface.

Two methods for preparation of the composite membrane are described. In the first preparation method a layer of Nafion was applied to a surface of a intermediate support. A porous support was then brought into contact with the wet Nafion layer. The porous support was immediately impregnated with nafion and became transparent. The composite membrane was then dried at 60° C. for 5 minutes to remove the solvent by evaporation. The dry composite membrane was removed from the intermediate support.

In the second preparation method the dry composite membrane on the intermediate support are rolled up in a continuous manner on the wind-up station.

As possible coating methods are mentioned: forwarding roll coating, reverse roll coating, gravure coating, kiss coating, doctor blade coating or die coating.

EP-A 1702668 discloses a composite ionomeric membrane comprising a layer or film of a porous inert support on which a sulphonic (per)fluorinated ionomer is deposited. The membranes are prepared by a process comprising the following steps:

1) preparing a liquid dispersion comprising the (per) fluorinated ionomer, in acid or salified form;

2) depositing the dispersion on the surfaces of a porous support to form a film or layer, thereby obtaining a film of impregnated porous inert material;

3) applying on one side of the film or layer of the impregnated porous inert material a support of a non porous material having smooth surfaces, wherein the support is inert under the conditions used in step 4) of the process;

4) annealing at temperatures from 130° C. to 280° C.;

5) detachment of the membrane from the support.

It is described to apply the ionomer to the ePTFE in order to impregnate it, afterwards the impregnated ePTFE is laid upon an intermediate support followed by drying and annealing. At the end the membrane is delaminated from the intermediate support.

While current composite ion exchange membranes developed for use in fuel cells have achieved a measure of success, there are still many areas for additional improvement. First, as noted above, the microporous substrate is filled with ion exchange material. Generally speaking, the ion exchange material is the most expensive component of the composite. Thus, essentially the impact of the ionomer on the membrane cost should be minimized/optimized as much as possible. The amount of ionomer should be as small as possible. The variation in amount should also be as small as possible. Second, current methods for producing such composite ion exchange membranes typically involve multiple coating steps to fully impregnate the substrate with ion exchange material. Alternatively, or in addition, such methods comprise steps for facilitating impregnation, such as ultrasonication, or adding surfactants to the impregnation solution. These steps increase the time, complexity, and cost of producing composite ion exchange membranes. This is particularly the case where surfactants are added to the impregnation solution, which generally necessitates an additional processing step to remove the surfactant before using the composite membrane in a fuel cell. Third, current methods for producing such composite ion exchange membranes typically have to deal with wetted ePTFE that is very difficult to handle. In some patents it has been described to place the wetted ePTFE upon an intermediate support for easier handling, but the wetting process remains a difficult one. Some patent have described to make laminates of ePTFE with intermediate supports, but even then overcoating of this laminate with a precise metered amount of ionomer is very difficult.

It is desirable to have a composite ion exchange membrane suitable for use in fuel cells that is less expensive and easier to produce than current composite ion exchange and that provide comparable fuel cell performance and improved membrane layer characteristics.

SUMMARY OF THE INVENTION

Preferred embodiments of the present invention provide a novel preparation method with which composite membranes, for example Proton Exchange Membranes (PEM), can be made at a lower cost while maintaining the performance of the membranes in for example fuel cells at a high level.

Other preferred embodiments of the present invention provide novel composite membranes which can be prepared by the methods described below.

Further advantages and embodiments of the present invention will become apparent from the following description.

BRIEF DESCRIPTION OF THE DRAWINGS

FIG. 1 shows a schematic representation of a first embodiment of a method according to the present invention.

FIG. 2 shows a schematic representation of a second embodiment of a method according to the present invention.

FIG. 3 shows a SEM picture of a composite membrane prepared with the comparative method of Example 1.

FIG. 4 shows a SEM picture of a composite membrane prepared with the inventive method of Example 2.

FIG. 5 shows a SEM picture of a composite membrane prepared with the inventive method of Example 3.

FIG. 6 shows a SEM picture of a composite membrane prepared with the inventive method of Example 4.

FIG. 7 shows a SEM picture of a composite membrane prepared with the inventive method of Example 5.

DETAILED DESCRIPTION OF THE PREFERRED EMBODIMENTS

Figure 8A:
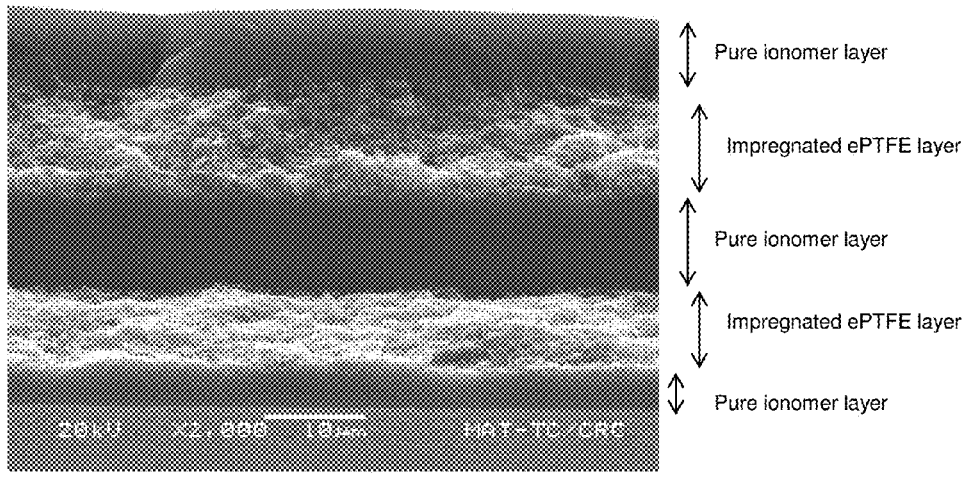
FIG. 8 shows a SEM picture of a composite membrane prepared with the inventive method of Example 6.

First Embodiment of the Method to Prepare a Composite Membrane

A method for making a composite membrane according to a first embodiment of the present invention comprises the steps of:

a) coating a first layer of ionomer on an intermediate support;

b) laminating a dry porous support into the wet first layer of ionomer;

c) impregnating the porous support with ionomer from the first layer of ionomer;

d) coating a second layer of ionomer on the impregnated porous support;

e) drying the impregnated porous support, the first and second layer of ionomer thereby obtaining the composite membrane on the intermediate support;

f) delaminating the composite membrane from the intermediate support.

Preferably an annealing step is carried out between the drying step e) and the delaminating step f).

A schematic representation of the method according to the first embodiment is shown in FIG. 1.

An intermediate support is unwinded (2). A first layer of ionomer is coated on the intermediate support (3). A porous support is unwinded (1) and laminated into the wet first layer of ionomer (5).

In the lamination step, the porous support is preferably not pressed via a contact roller into the wet ionomer layer, but preferably with a certain angle (4) over a contact roller resulting in a slight contact force between the porous support and the wet ionomer layer.

As soon as the porous support makes contact with the wet ionomer layer, impregnation of the support with the ionomer starts. When the support becomes more and more impregnated, it becomes more and more translucent. When impregnation is complete, the support is translucent, i.e. the opacity of the support is ±0.

A second ionomer layer is coated (6) on the impregnated porous support. The porous support is preferably fully impregnated before the second ionomer layer is applied. It is preferred that lamination of the porous support into the wet first layer of ionomer (5) is carried out as close a possible to the first coating head (3) to ensure enough time for the support to become fully impregnated before applying the second ionomer layer with the second coating head (6), even at high processing speeds. The time between lamination of the porous support into the wet first ionomer layer and applying the second layer of ionomer is preferably at least 20 seconds, more preferably at least 30 seconds at room temperature.

The impregnation speed depends on the temperature, i.e. at higher temperature, the impregnation speed typically increases. The impregnation is preferably carried out at room temperature. The relative humidity (RH) may also have an influence on the impregnation speed. Preferably the RH is between 25 and 75%, more preferably the RH is approximately 50%.

Also the ionomer dispersion medium may influence the impregnation speed. For example the solvents used may influence the surface tension of the ionomer solution or dispersion. To optimize the impregnation speed, one or more co-solvents may be added to the aqueous dispersion. The co-solvents may be ethanol, propanol, isopropanol, butanol, dimethylformamide (DMF), N-methylpyrrolidone (NMP), N-ethyl-pyrrolidone (NEP), dimethylsulfone, (DMS), dimethylsulfoxide (DMSO), and combinations thereof. Preferred co-solvents are alcohols such as ethanol, propanol, isopropanol, butanol, etc. The amount of co-solvents is preferably 1 to 50% (w/w), more preferably 5 to 30% (w/w), and most preferably 10 to 20% (w/w).

The viscosity of the ionomer dispersion may also influence the impregnation speed. Preferred viscosities of the ionomer dispersion are 10 to 150 mPa·s, more preferably 20 to 100 mPa·s, and most preferably 40 to 70 mPa·s (at 100 $s^{-1}$).

The fact that the impregnated porous support is supported by the intermediate support throughout the preparation method prevents the occurrence of "sack-formation" resulting in an improved overall quality of the obtained composite membrane.

The stress applied to the porous support may also influence the overall quality of the obtained composite membrane. If for example a microporous polytetra-fluoroethylene (ePTFE) film is stressed by more than 20% then the porous character is largely effected and the impregnation speed dramatically changes, resulting in bad impregnation characteristics and bad membrane structures. For this reason it is very important to have precise tension control on the ePTFE part of the production process, and to limit the part of the production machine in which the ePTFE is in unsupported condition as much as possible.

It has also been observed that the layer structure of the composite membrane obtained at the start of the preparation method may differ from the membrane obtained at the end of the preparation method.

This may be the result of variations in conditioning of the porous support. The reason for this variation might come from both the tension on for example an ePTFE film that may be different at the end and at the beginning of a roll of ePTFE film, and/or the moisture condition that might be different for the beginning and the end of the roll. It will be obvious for those skilled in the art that any means that can influence the impregnation speed can be used during a fabrication run to compensate for these variations in ePTFE film conditions. For example, such a compensation may involve reducing the coating speed and/or increasing the conditioning temperature and/or increasing the co-solvent content at the start of a fresh ePTFE roll (to improve the impregnation) and diminish these conditions in function of production time when the more interior parts of the ePTFE film roll are being converted.

After applying the second ionomer layer the sandwich "second ionomer layer—impregnated porous support—first ionomer layer is dried in a drying zone (7). The drying temperature is preferably between 70 and 150° C., more preferably between 100 and 120° C.

Preferably after drying, an annealing step is carried out in an annealing zone (8). The annealing temperature is preferably between 120 and 300° C., more preferably between 190 and 230° C.

The annealing step results in a composite membrane adhered to the intermediate support. The composite membrane (10) is then delaminated from the intermediate support (9). The edges of non-coated porous support are removed by slitting before the composite membrane is wound. The composite membrane and the intermediate support may then be coiled.

The overall processing speed may depend on the impregnation step, the drying step or the annealing speed. The overall processing step is preferably up to 0.3 to 1 m/min.

Second Embodiment of the Method to Prepare a Composite Membrane

The method according to a second embodiment of the invention for making a composite membrane comprises the steps of:

a') coating a first layer of ionomer on an intermediate support;

b') laminating a dry porous support into the wet first layer of ionomer;

c') impregnating the porous support with ionomer from the first layer of ionomer;

d') drying the impregnated porous support and the first layer of ionomer until most of the solvent is evaporated;

e') coating a second layer of ionomer on the impregnated porous support;

f') drying the second layer of ionomer thereby obtaining the composite membrane on the intermediate support;

g') delaminating the composite membrane from the intermediate support.

A schematic representation of the second embodiment is shown in FIG. 2.

An intermediate support is unwinded (12). A first layer of ionomer is coated on the intermediate support (13). A porous support is unwinded (11) and laminated on the wet first layer of ionomer (15). In the lamination step, the porous support is preferably not pressed via a contact roller into the wet ionomer layer, but preferably with a certain angle (14) over a contact roller resulting in a slight contact force between the porous support and the wet ionomer layer.

As soon as the porous support makes contact with the wet ionomer layer, impregnation of the support with the ionomer starts. When the support becomes more and more impregnated, it becomes more and more translucent. When impregnation is complete, the support is translucent, i.e. the opacity of the support is ±0.

The impregnated porous support and the first ionomer layer are then dried in a drying zone (16) until most of the solvent is evaporated. The drying temperature is preferably between 70 and 150° C., more preferably between 100 and 120° C.

After the drying step, a second ionomer layer is applied on the porous impregnated support (17).

This second layer of ionomer is then dried in a second drying zone (18) until most of the solvent is evaporated. The drying temperature is preferably between 70 and 150° C., more preferably between 100 and 120° C.

The composite membrane (21) is then delaminated from the intermediate support (20). Both the composite membrane and the intermediate support may then be coiled.

Preferably an annealing step (19) is carried out between the second drying step f' and the delaminating step g'.

The configuration according to embodiment 2 of this invention has more flexibility with respect to the impregnation timing of the ionomer into the porous support (as compared to embodiment 1), but at the expense of complexity and compactness of the fabrication device.

Additional Processing Steps

Additional processing steps may be included into both methods such as in-line slitting of the membrane to a requested width, co-winding the composite membrane with an additional thicker co-winding material (for example a PET film), treating the composite membrane prior to co-winding with the co-winding material in order to improve the adhesive strength to the co-winding material (for example temperature treatment, moisture treatment, additional thin-layer coating).

Especially for thin composite membranes it may be advantageous to use a co-winding material (supporting) material to store and transport the composite membrane. The composite membrane is then delaminated from the supporting material when it is incorporated into for example a fuel cell.

Slitting may be done after co-winding with the extra support (for example a PET support), so that both membrane and supporting film have the same width; or slitting can be done prior to co-winding with the supporting film. In this last case different pre-slitted supporting films have to be supplied via separate unwinding rollers. In this case the supporting film may be chosen to be wider than the membrane, which of course means that part of the membrane (for example 1 cm width) has to be discarded at each slitting position. In this case the small width that has to be slitted away is best winded upon a separate winding roller with precisely set torque.

A precise adhesion force of the reinforced membrane to the supporting film may be needed for easier handling afterwards. It is clear for those skilled in the art that any means to increase adhesion forces between two substrates may be used in order to realise this requirement. Physical means such as corona or plasma treatment on either or both reinforced membrane and supporting film are possible. Increasing the moisture content during the co-winding process is another alternative. This may be done via changes in the relative humidity and/or temperature during the co-winding process, or it can be done via an additional wet treatment such as coating, spraying, dipping of an aqueous or solvent based composition. Improving the adhesion may also be done via temperature treatment, such as using hot-roller-systems to press the membrane-supporting film combination prior to co-winding, moving said membrane-film-sandwich over a heated friction surface, using IR and/or hot air blowers on either membrane or film support prior to co-winding.

Any variation in time, pressure, temperature, and relative humidity may be used to finetune the adhesive force to the wanted level.

Additional process steps might be included into the fabrication flow, such as the in-line coating of a catalyst layer on top of the reinforced membrane. It is also possible to start with a catalyst coating on the intermediate support, followed by the process as described in embodiments 1 or 2, and followed by an additional coating of a second catalyst layer on the other side of the reinforced membrane.

For thin composite membranes, it may be advantageous to guide the membrane over stretching rollers between delamination of the membrane from the intermediate support and co-winding the membrane together with the supporting film. The presence of such stretching rollers may inhibit wrinkle formation in the membranes.

The intermediate support in both embodiments may be used as coils, as shown in FIGS. 1 and 2 (coil to coil process) or it may be used as a closed loop in the methods disclosed above.

After delaminating the composite membrane from the intermediate support, that intermediate is preferably cleaned before it is used again in the process. Cleaning may be performed using well known cleaning method, such as cleaning rolls, etc.

Multi-Pass Coating

To prepare thick composite membranes, the methods disclosed above may be repeated one or several times.

Using the method according to the first embodiment of the invention, the dried composite membrane adhered to the intermediate support (leaving the drying zone 7) is winded up. In a second pass, the dried composite membrane (on the intermediate support) is unwinded (2) and provided with an additional layer of ionomer (3). Then, a second porous support is laminated into the wet ionomer layer (5). Another ionomer layer is then applied on the impregnated porous support (6) and dried in the drying zone 7. To obtain the final composite membrane, an annealing step is preferably carried out in the annealing zone (8) followed by delamination from the intermediate support (9) to obtain the final composite membrane (10). However, when an additional pass is necessary after drying, the process is repeated once again before the annealing step.

Such a multi-pass coating may also been done according to the second embodiment of the invention.

Using such a multi-pass coating, a composite membrane comprising multiple stacks of a porous support impregnated with an ionomer and provided with a pure ionomer layer on both sides of the impregnated support is obtained. For example a two-pass coating results in a composite membrane comprising a pure ionomer layer (undercoat), a first reinforced zone (impregnated porous support), a pure ionomer layer, a second reinforced zone and a pure ionomer layer (overcoat); a 3-pass coating results in a composite membrane comprising a pure ionomer layer (undercoat), a first reinforced zone, a pure ionomer layer, a second reinforced zone, a pure ionomer layer, a third reinforced zone and a pure ionomer layer (overcoat); etc.

Such a composite membrane preferably has a thickness of more than 30 µm, more preferably of more than 50 µm. By introducing multiple reinforced zones into a thick composite membrane, the strength of such a thick membrane may be improved.

Intermediate Support

The intermediate support used in a method of the present invention may be any support withstanding the processing conditions used, such as the drying and annealing temperature. Also, the composite membrane formed has to delaminated from the intermediate support without major defects occurring during delamination. Also, the intermediate support has to be inert towards the ionomer used.

Polyimide films are preferred intermediate supports, for example the Kapton® Polyimide films from Dupont. Kapton® HN polyimide film is a tough, aromatic polyimide film, exhibiting an excellent balance of physical, chemical, and electrical properties over a wide temperature range, particularly at unusually high temperatures.

Preferably Kapton® FN polyamide films are used. Kapton® FN polyimide film is a heat sealable grade that retains the unique balance of properties of Kapton® HN over a wide temperature range. This is achieved by combining Kapton® HN with DuPont™ Teflon® FEP fluorocarbon resin in a composite structure.

Other intermediate supports that may be used are CHEMFAB® films, PTFE-coated glass and aramid (Kevlar®) fabrics from Saint Gobain. Also the Synthetica®, PFTE coated glass and aramid fabrics from Fluorplastics GmnH may be used.

Ionomer

The term ionomer is used to refer to a polymeric material having a pendant group with one or more ionic groups. An ionomer typically has cation exchange groups that can transport protons.

Well known ionomers are fluorinated ionomers. Fluorinated ionomers typically means ionomers in which at least 30% of the total number of halogen and hydrogen atoms are fluorine atom. Such fluorinated ionomers that may be used are disclosed in for example U.S. Pat. No. 4,433,082, U.S. 615026, US2008292935, WO2008054420 and WO2010142772.

One of the most common and commercially available ionomers used in PEM membranes is Nafion® from Dupont. It is a sulfonated tetrafluoroethylene based fluoropolymer-copolymer. Its ionic properties are a result of incorporating perfluorovinyl ether groups terminated with sulfonate groups onto a tetrafluoroethylene (Teflon) backbone.

Other commercially available perfluorosulfonic acid (PFSA) ionomers are e.g. Flemion® from Asahi Glass and Aciplex® from Asahi Kasei.

Another commercially available PFSA ionomer is Aquivion™ from Solexis.

All ionomers currently used in PEM membranes may be used in the methods of the present invention.

Ionomer layers are coated on the porous support from ionomer solutions or dispersions. Liquid compositions are typically prepared by dissolving/suspending the ionomers in an appropriate aqueous or aqueous-alcoholic medium the. Methods for obtaining such liquid dispersions for perfluorinated ion exchange polymer are disclosed in U.S. Pat. No. 4,433,082, GB1286859, EP1004615, U.S. Pat. No. 6,150, 426 and WO2010142772.

The ionomer dispersions are preferably optimized towards coatability and impregnation of the porous support. Also the drying properties of the layers have to be taken into account.

The viscosity of the ionomer dispersions is preferably 10 to 150 mPa·s, more preferably 20 to 100 mPa·s, and most preferably 40 to 70 mPa·s (at 100 s$^{-1}$).

The surface tension of the ionomer dispersions is preferably between 22 and 50 mN/m, more preferably between 25 and 30 mN/m.

The solid content of the ionomer dispersions is preferably between 5 and 30%, more preferably between 15 and 25%.

Surfactants may be added to further optimize coating and impregnation properties of the ionomer dispersions. It is however particularly preferred not to use surfactants in the ionomer dispersions. If surfactants are used in order to improve the coating characteristics, then an additional wash step may be required to remove these surfactants prior to utilization of the membrane into the fuel cells.

The ionomer dispersions used for the first ionomer layer and the second ionomer layer may be different from each other. The ionomer dispersion for the first ionomer layer for example may be adapted for increased impregnation speed, while the dispersion for the second ionomer layer may be adapted for improved drying characteristics. The composition of both ionomer dispersions might also be varied in function of the symmetry/asymmetry of the resulting membrane. In this way it is possible to fine-tune curling behaviour. Preferably a symmetric composite membrane is obtained, i.e. the dry thickness of both ionomer layers are approximately identical (i.e. the thickness of both layers differs preferably less than 20%, more preferably less than 10%, most preferably less than 5%, particularly preferred less than 2.5%). Such a symmetric membrane has superior curling behaviour. For sake of symplicity, however, it is preferred to use identical ionomer dispersions for both ionomer layers.

Porous Support

The choice of the porous support is not particularly limited. However, preferred porous supports are inert under the final composite membranes operating conditions.

Well known porous inert materials able to give to composite membranes suitable mechanical properties are made of woven or non-woven polyolefin membranes, in particular polyethylene membranes, and (per)fluoropolymer porous supports. Porous supports of (per)fluoropolymers are generally preferred because of their high chemical inertia.

Biaxially expanded PTFE (Polytetrafluorethylene) porous supports, often referred to as ePTFE membranes, are particularly preferred porous supports. Such supports are commercially available under trade names GORE-TEX® (from W. L. Gore & Associates) and TETRATEX® (from Donaldson).

Coating of the Ionomer Layers

Different coating techniques to apply the ionomer layers on the intermediate support may be used such as air knife coating, slide coating, cascade coating, curtain coating, slot coating, roll coating, gravure coating, etc.

Preferably, a metered dosing technique to carefully control the coating thickness of both ionomer layers is used. The coating thickness is preferably between 50 and 200 μm, more preferably between 80 and 120 μm.

The coating thickness of both ionomer layers may be identical or different from each other.

The precise control of the coating thickness of both ionomer layers in the method according to the present invention is a major advantage over prior art preparation methods wherein the ionomer layers are applied on a porous support by dip coating. The coating thickness is now independent of the viscosity and surface tension of the ionomer coating solutions.

This enables the preparation of thin composite membranes having a thickness of preferably less than 35 μm, more preferably 25 µm. This also enables the preparation of symmetric membranes as defined above.

Drying Step

In the drying step, the coating solvents are removed. The drying temperature is preferably between 70 and 150° C., more preferably between 100 and 120° C.

In the method according to the second embodiment, both drying condition may be identical or different from each other. Preferably however, the drying conditions are identical in both drying steps.

Drying of a coating is typically carried out in so called drying tunnels. The length of the drying tunnel will determine the speed at which the coating may pass through the tunnel: the speed may be increased when the length of the drying tunnel increases.

The heat for drying is usually supplied by convection from air that has been heated indirectly by a steam heat exchanger or by electric heaters of directly from hot flue gases from the combustion of natural gas.

The heat may also be supplied by conduction from heated rolls in drum dryers of from heated plates in a gap dryer.

The heat may also be supplied by infra-red or microwave radiation.

Preferably, the heat is supplied by convention. Infra-red heaters may be used in addition to convection heaters to increase the drying capacity.

In the convection units, the drying air impinges on the coating. The temperature and the RH of the air are controlled.

Several drying zones (units) may be used, having the same or different drying conditions.

Annealing Step

The annealing step, typically conceived for consolidating the impregnated porous support and thus yielding the final composite membrane, is generally carried out at a temperature of at least 120° C., preferably of at least 150° C., more preferably of at least 180° C. Maximum temperature is not particularly limited, provided that the porous support and the (per)fluoroionomer (I) remain stable under these conditions. It is thus generally understood that the annealing is carried out at a temperature not exceeding 270° C., preferably not exceeding 250° C., more preferably not exceeding 220° C. The process of the invention typically comprises only one annealing step, which is generally carried out once completed (all) impregnating/drying sequence(s).

EXAMPLES

Materials

All materials used in the following examples were readily available from standard sources such as ALDRICH CHEMICAL Co. (Belgium) and ACROS (Belgium) unless otherwise specified. All materials were used without further purification unless otherwise specified.

Tetratex® 3101, an expanded PTFE porous support from Donaldson, having a thickness of 38 µm and a width of 400 mm.

TETRATEX® 1326 expanded PTFE porous support from Donaldson, having thickness of 20 micron and width of 380 mm.

Tygaflor®, a glass fabric impregnated with polytetrafluorethylene (PTFE) from Courtaulds Aerospace Limited, used as an intermediate support having a thickness of 0.150 mm.

Kapton® Polyimide film (Type 500FN131 from Dupont)

Aquivion®PFSA, an ionomer from Solvay.

Aquivion®PTFE dispersion D79-20GSX containing ±20 wt % fluoropolymer from Solvay.

Aquivion®PTFE dispersion D79-20GX containing ±20 wt % fluoropolymer from Solvay.

SEM Images of the Composite Membranes

The composite membranes obtained in the comparative and inventive examples were characterized by taking a SEM image.

The membrane was broken in liquid nitrogen and fixed to a carbon tape. After mounting upon a holder a thin layer of Pt—Pd was sputtered. Then the SEM picture was taken on a FEI Sirion Field-Emission-Gun Scanning Electron Microscope.

Example 1

This comparative example was made according to EP1702668 and WO2010/142772.

A roll of porous Tetratex® 3103 was un-wound to pass into a vessel containing 15 liters of Aquivion®PTFE dispersion. The Aquivion®PTFE dispersion had a solid content of 15 wt % fluoropolymer, dispersed in a solvent mixture of 58 wt % water and 42 wt % propanol. The viscosity of the dispersion was 50 mPa·s at 100 s$^{-1}$. The dispersion contained in the impregnation vessel was kept well mixed during the process by a recirculation pump at ambient temperature. The applied layers of the dispersion was approximately 2×30 µm.

A Tac Cast 10 carrier film (width 500 mm; 600 g/m$^2$; nominal thickness 0.275 mm) from Taconic International was adhered to the impregnated porous support and the assembly was moved at a constant speed of 4 cm/min.

Two engines, the former at the beginning of the line, where the carrier film was un-wound, the latter at the end of the line after the oven, maintained the carrier film/impregnated support assembly to the required speed of 4 cm/min and the desired tension.

The assembly was then moved into an oven, divided into two sections, the first kept at 80° C. with air recirculation (for solvents evaporation), the second kept at 190° C. (for membrane annealing).

The membrane was then separated from the support and the measured average thickness was 22 micron. The membrane appeared completely transparent and without visible defects. A roll of one hundred linear meters of reinforced membrane were produced (in 41 hours).

A SEM picture of the resulting membrane is shown in FIG. 3. The membrane is not perfectly symmetrical. The upper layer of pure Aquivion has a thickness of 3 µm, the reinforced ePTFE-part has a thickness of 8 µm, and the lower layer of pure Aquivion in FIG. 1 has a thickness of 10µ.

Major drawback of this process of production is the very limited way of operation. If for example the viscosity of the ionomer dispersion is changing a bit, the resultant layer thickness will be influenced. Either the dispersion composition will have to be altered, and/or the process speed will have to be altered. Laying down a prewetted ePTFE-layer upon an intermediate (Tygaflor or Polylmide (PI)) substrate is also a tough process that has to be done very carefully. The membrane quality on some areas is very good (see SEM picture) but the process reliability is very moderate, and scaling up to industrial processes at high line speeds is almost not possible. This process of dipping does not allow at all to have nice control on the thickness of the applied layer of Aquivion. If a much larger thickness is required, then multiple passes are required in order to end up with the final desired membrane thickness.

Example 2

This inventive example illustrates the first embodiment of the present invention.

An intermediate support of Tygaflor® was unwinded at 33 cm/min and coated with a first layer of Aquivion®PTFE dispersion (Aquivion®PTFE dispersion D79-20GSX) at a wet thickness of 75 µm and a coating width of 620 mm. Then, a Tetratex® 3103 ePTFE support was unwinded and laminated in the wet layer of Aquivion as shown in FIG. 1, i.e. the ePTFE support is not pressed via a contact roller into the wet Aquivion layer, but with a certain angle (4) over a contact roller resulting in a slight contact force between the ePTFE support and with the wet Aquivion layer.

Immediately after contacting the ePTFE with the wet layer, solvent and ionomer movement into the pores of the ePTFE takes place. An impregnation length of 60 cm is allowed for the Aquivion to fully penetrate into the pores of the ePTFE, and then a second overcoat of Aquivion dispersion is applied on top of this wet layer (but on the other side) with a thickness of 63 µm.

The coating speed for both Aquivion layers was 0.33 m/min.

The resulting wet film is dried for 10 minutes at 90° C. and then annealed for 12 minutes at 210° C.

In the final part of the process the dried reinforced membrane is delaminated from the Tygaflor® support and co-winded with a supporting 65 µm thick PET-film on a roll.

It is not bound to any theory but this process allows us to place ionomer dispersion in between the Tygaflor support and the ePTFE support, and additional ionomer dispersion on top of the ePTFE, while all evaporation of solvent has to take place on the upper side of the ePTFE. By finely controlling the metered amounts of Aquivion dispersion on both sides of the ePTFE support and the drying characteristics, the dynamics of migration of solvent and ionomer through the ePTFE can be set resulting in nice symmetric or asymmetric PEM membranes as depicted in the SEM images. There is a much better control to this process as compared to the process of comparative example 1: now both wet coating thicknesses can be set very precisely and are independent of ionomer variation in viscosity and/or surface tension. The wet ePTFE is always supported by the Tygaflor so that waviness of "sack-formation" is prevented and the overall quality of the membranes is much better.

A SEM picture of the resulting composite membrane is shown in FIG. 4. The composite membrane has an overcoat of 6.5 µm, an impregnated ePTFE layer of 7.6 µm and an undercoat of 4.8 µm. The total thickness is 18.9 µm

Example 3

A composite membrane was prepared as disclosed in Example 2, however now using a coating speed for both Aquivion layers of 1.8 m/min instead of 0.33 m/min. The wet coating thickness of the first applied Aquivion layer was 77.2 µm, the one of the second applied Aquivion layer was 67.5 µm.

A SEM picture of the resulting composite membrane is shown in FIG. 5. The composite membrane has an overcoat of 6.6 µm, an impregnated ePTFE layer of 7.6 µm and an undercoat of 4.4 µm. The total thickness is 18.6 µm.

Example 4

This example illustrates that with the preparation method of the present invention (first embodiment), thin membranes can be prepared.

A thin PEM membrane was constructed with the method as described in embodiment 1. An intermediate support of Kapton® Polyimide film (Type 500FN131 from Dupont) was unwinded at 33 cm/min and coated with a first layer of Aquivion®PTFE disperion (Aquivion®PTFE dispersion D79-20GSX) in a wet thickness of 52.7 µm at a coating width of 620 mm. Then an ePTFE support (TETRATEX® 1326 expanded PTFE porous support from Donaldson, having thickness of 20 micron and width of 380 mm) was unwinded and laminated into the wet layer of Aquivion as described in example 2. Immediately after contacting the ePTFE with the wet Aquivion solvent and ionomer movement into the pores of the ePTFE takes place. An impregnation length of 60 cm is allowed for the Aquivion to fully penetrate into the pores of the ePTFE, and then a second overcoat of Aquivion dispersion is applied on top of this wet layer (but on the other side) with a thickness of 44.7 µm.

The coating speed for both Aquivion layers was 0.33 m/min.

The resulting wet film is dried for 10 minutes at 90° C. and then annealed for 12 minutes at 210° C.

In the final part of the process the dried reinforced membrane is delaminated from the polyimide support and co-winded with a supporting 65 µm thick PET-film on a roll.

A SEM picture of the resulting composite membrane is shown in FIG. 6. The composite membrane has an overcoat of 3.4 µm, an impregnated ePTFE layer of 3.7 µm and an undercoat of 2.9 µm. The total thickness is 10.0 µm

Example 5

This inventive example illustrates the second embodiment of the present invention, schematically shown in FIG. 2.

An intermediate support of Tygaflor® was unwinded at 33 cm/min and coated with a first layer of an Aquivion®PTFE dispersion D79-20SX in a wet thickness of 100 µm (3) at a coating width of 320 mm. Then an ePTFE (TETRATEX® 3101 expanded PTFE porous support from Donaldson, having thickness of 38 micron and width of 350 mm) was unwinded and laminated into the wet layer of Aquivion as shown in FIG. 2: i.e. the ePTFE is NOT pressed via a contact roller into the wet Aquivion layer, but with a certain angle (4) over a contact roller so that a slight contact force with the wet layer can result.

The layer was dried at 80° C. for 5 minutes. In a second zone of the coating machine (8) a second layer of an Aquivion®PTFE dispersion D79-20GX was applied on top of this dried layer with a wet thickness of 75 µm.

The coating speed for both Aquivion layers was 0.33 m/min.

The resulting wet film is dried for 10 minutes at 90° C. and then annealed for 12 minutes at 210° C.

In the final part of the process the dried reinforced membrane is delaminated from the Tygaflor support and co-winded with a supporting 65 µm thick PET-film on a roll.

A SEM picture of the resulting composite membrane is shown in FIG. 7. The composite membrane has an overcoat of 14.8 µm, an impregnated ePTFE layer of 11.0 µm and an undercoat of 80.2 µm. The total thickness is 34.0 µm

Example 6

This example illustrates multi-pass coating to obtain a thick composite membrane. The preparation is according to embodiment 1 of the present invention.

An intermediate support of Tygaflor® was unwinded at 33 cm/min and coated with a first layer of an Aquivion®PTFE dispersion D79-20SX in a wet thickness of 75 μm at a coating width of 620 mm. Then an ePTFE (TETRATEX® 3101 expanded PTFE porous support from Donaldson, having thickness of 38 micron and width of 650 mm) was unwinded and laminated in the wet layer of Aquivion as shown in FIG. 2: i.e. the ePTFE is NOT pressed via a contact roller into the wet Aquivion layer, but with a certain angle over a contact roller so that a slight contact force with the wet layer can result. Immediately after contacting the ePTFE with the wet Aquivion solvent and ionomer movement into the pores of the ePTFE takes place. An impregnation length of 60 cm is allowed for the Aquivion to fully penetrate into the pores of the ePTFE, and then a second layer of Aquivion dispersion is applied on top of this wet layer (but on the other side) with a thickness of 63 μm.

The resulting wet film is dried for 10 minutes at 90° C.

For the composite membrane depicted in FIG. 8a the process was repeated once. The first reinforced membrane on the Tygaflor support was unwinded at 33 cm/min and coated with a first layer of Aquivion ionomer in a wet thickness of 75 μm at a coating width of 620 mm. Then an ePTFE (TETRATEX® 3101 expanded PTFE porous support from Donaldson, having thickness of 38 micron and width of 650 mm) was unwinded and laminated in the wet layer of Aquivion as shown in FIG. 1: i.e. the ePTFE is NOT pressed via a contact roller into the wet Aquivion layer, but with a certain angle over a contact roller so that a slight contact force with the wet layer can result. Immediately after contacting the ePTFE with the wet Aquivion solvent and ionomer movement into the pores of the ePTFE takes place. An impregnation length of 60 cm is allowed for the Aquivion to fully penetrate into the pores of the ePTFE, and then a second overcoat of Aquivion dispersion is applied on top of this wet layer (but on the other side) with a thickness of 63 μm.

The resulting wet film is dried for 10 minutes at 90° C. Then the final membrane was annealed for 12 minutes at 210° C.

Figure 8B:
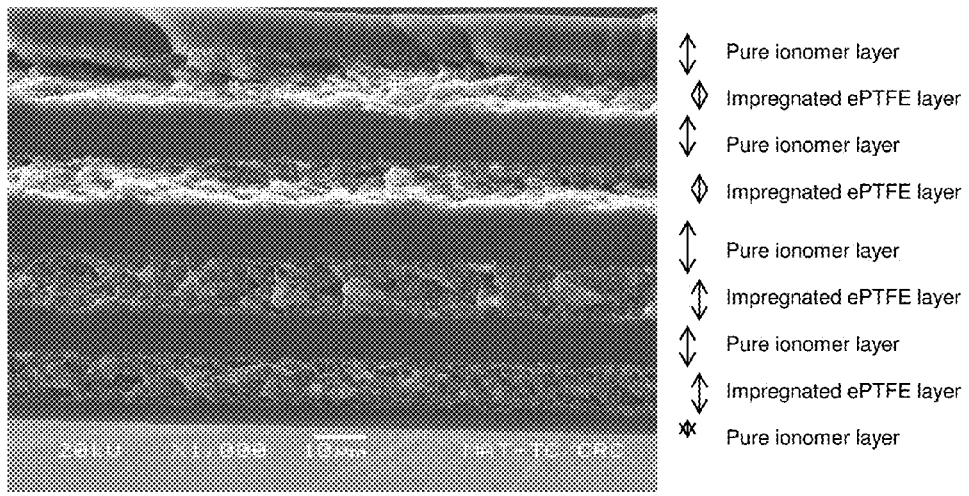

For the composite membrane depicted in FIG. 8b the second part of the process was repeated two times more, resulting in a very thick membrane having 4 separate reinforced material areas over the full thickness.

As visible in the SEM images, the composite membrane of FIG. 8a had a pure Aquivion undercoat of 7.4 μm, followed by a reinforced zone of 10.9 μm, followed by a pure Aquivion zone of 9.2 μm, followed by a reinforced zone of 8.0 μm, followed by a final pure Aquivion overcoat of 3.4 μm. This resulted in a total membrane thickness of 38.9 μm.

The composite membrane of FIG. 8b had a pure Aquivion undercoat of 7.9 μm, followed by a reinforced zone of 11.6 μm, followed by a pure Aquivion zone of 9.9 μm, followed by a reinforced zone of 10.4 μm, followed by a reinforced zone of 11.3 μm, followed by a pure Aquivion zone of 12.1 μm, followed by a reinforced zone of 9.2 μm, followed by a pure Aquivion zone of 8.9 μm, followed by a final pure Aquivion overcoat of 4.2 μm. This resulted in a total membrane thickness of 85.5 μm.

In the final part of the process the dried reinforced membrane is delaminated from the Tygaflor support and co-winded with a supporting 65 μm thick PET-film on a roll.

The invention claimed is:

1. A method for making a composite membrane comprising the steps of:
    coating a first layer of an ionomer on an intermediate support;
    laminating a porous support into the first layer of the ionomer while the first layer of the ionomer is still wet from the step of coating;
    impregnating the porous support with the ionomer from the first layer of the ionomer;
    coating a second layer of the ionomer on the impregnated porous support;
    drying the impregnated porous support, the first layer of the ionomer, and the second layer of the ionomer to obtain the composite membrane on the intermediate support; and
    delaminating the composite membrane from the intermediate support.

2. The method for making a composite membrane according to claim 1, wherein an additional step of drying is carried out between the step of impregnating and the step of coating the second layer of the ionomer.

3. The method for making a composite membrane according to claim 1, wherein the porous support is substantially translucent after completion of the step of impregnating.

4. The method for making a composite membrane according to claim 1, further comprising a step of annealing that is performed between the step of drying and the step of delaminating.

5. The method for making a composite membrane according to claim 4, wherein the step of annealing is carried out at a temperature above 120° C.

6. The method for making a composite membrane according to claim 1, wherein a coating thickness produced by the step of coating the first layer of the ionomer is different from a coating thickness produced by the step of coating the second layer of the ionomer.

7. The method for making a composite membrane according to claim 1, wherein a coating solution used in the step of coating the first layer of the ionomer is different from a coating solution in the step of coating the second layer of the ionomer.

8. The method for making a composite membrane according to claim 1, further comprising a step of cleaning the intermediate support after the step of delaminating or prior to the step of coating the first layer of the ionomer.

9. The method for making a composite membrane according to claim 1, further comprising a step of winding the composite membrane with a supporting film after the step of delaminating the composite membrane from the intermediate support.

10. The method for making a composite membrane according to claim 1, wherein the steps of coating the first layer of the ionomer through the step of drying the impregnated porous support are repeated one or more times.

11. The method for making a composite membrane according to claim 1, wherein the ionomer is a perfluorosulfonic acid ionomer.

12. The method for making a composite membrane according to claim 1, wherein the porous support includes an expanded polytetrafluoroethylene film.

* * * * *